(12) United States Patent
Wood et al.

(10) Patent No.: US 8,024,311 B2
(45) Date of Patent: Sep. 20, 2011

(54) IDENTIFYING MEDIA ASSETS FROM CONTEXTUAL INFORMATION

(75) Inventors: Mark D. Wood, Penfield, NY (US); Stacie L. Hibino, San Jose, CA (US)

(73) Assignee: Eastman Kodak Company, Rochester, NY (US)

( * ) Notice: Subject to any disclaimer, the term of this patent is extended or adjusted under 35 U.S.C. 154(b) by 364 days.

(21) Appl. No.: 12/328,793

(22) Filed: Dec. 5, 2008

(65) Prior Publication Data

US 2010/0145959 A1 Jun. 10, 2010

(51) Int. Cl.
*G06F 17/30* (2006.01)
(52) U.S. Cl. .................... 707/705; 707/913; 707/915
(58) Field of Classification Search .......... 707/913, 707/915, 705
See application file for complete search history.

(56) References Cited

U.S. PATENT DOCUMENTS

| | | | |
|---|---|---|---|
| 6,353,824 B1 | 3/2002 | Boguraev et al. | |
| 6,360,217 B1 | 3/2002 | Gopal et al. | |
| 6,714,909 B1 | 3/2004 | Gibbon et al. | |
| 6,745,161 B1 | 6/2004 | Arnold et al. | |
| 6,810,146 B2 | 10/2004 | Loui et al. | |
| 7,028,253 B1 | 4/2006 | Lieberman et al. | |
| 7,120,586 B2 | 10/2006 | Loui et al. | |
| 7,184,959 B2 | 2/2007 | Gibbon et al. | |
| 7,324,984 B2 | 1/2008 | Tovinkere et al. | |
| 7,333,967 B1 | 2/2008 | Bringsjord et al. | |
| 2009/0319472 A1* | 12/2009 | Jain et al. ........... | 707/2 |

OTHER PUBLICATIONS

Pablo Gervás, et al., "Story Plot Generation based on CBR", Knowledge-Based Systems, 2005.

* cited by examiner

*Primary Examiner* — Hung Q Pham
(74) *Attorney, Agent, or Firm* — Justin D. Petruzzelli; Raymond L. Owens (57) ABSTRACT

Contextual information is received, and a chosen event is identified based at least upon an analysis of the contextual information. A set of media assets is then identified based at least upon an analysis of the identified event. At least some of the contextual information is associated in a processor-accessible memory system with the chosen event, at least one asset in the set of media assets, or both the chosen event and at least one asset in the set of media assets. By using an event to identify media assets to which contextual information is associated, fewer and more relevant media assets may be retrieved and annotated as compared to conventional techniques.

5 Claims, 10 Drawing Sheets

IDENTIFYING MEDIA ASSETS FROM CONTEXTUAL INFORMATION

FIELD OF THE INVENTION

This invention relates to assisted annotation and retrieval of digital media assets, such as digital still images or video. For example, some embodiments of this invention pertain to identification of media assets previously grouped into events based at least upon an analysis of input contextual information, such as a blog or spoken story.

BACKGROUND

As consumer collections of media assets, such as still images or videos, continue to grow, access and retrieval becomes increasingly daunting. The problem is compounded by the ease at which digital content may be captured and stored, enabling people to capture far more content than they would have with prior, film-based means of capture. Such content accumulates in the electronic equivalent of a picture "shoebox"—unused and unlooked at for years, due to the difficulty of retrieving content from specific events from such, generally unorganized, collections. Digital imaging is still a relatively new technology and most individual collections cover less than a decade; the problem will only worsen as digital imaging is used to record a lifetime of memories.

Such content may be manually annotated with text labels and stored in a database to be retrieved by keyword. However, manual annotation is a tedious task seldom performed by most consumers. With current interfaces, most people cannot be expected to invest a large amount of upfront effort to annotate their images in the hope of facilitating future retrieval. Research continues in algorithms to automatically extract semantic information from assets, including scene classifiers, activity recognizers and people recognizers. A high degree of accuracy in such algorithms remains elusive, particularly for algorithms attempting to extract higher-level conceptual information. The best source for such conceptual semantic information remains the users themselves; the challenge is to obtain such information in an unobtrusive manner and in a way that minimizes the amount of effort required by the user.

Earlier work described in U.S. Pat. No. 7,028,253 B1 to Lieberman et al. attempted to do just that—to obtain semantic information from the user by providing the user with a tool for automatic annotation and retrieval. While the '253 patent provides beneficial solutions, a continuing need in the art exists for improved solutions to retrieving and annotating media assets.

SUMMARY

The above-described problems are addressed and a technical solution is achieved in the art by a system and a method for identifying media assets that are potentially relevant to contextual information, according to various embodiments of the present invention. In an embodiment of the present invention, contextual information is received, and a chosen event is identified based at least upon an analysis of the contextual information. The contextual information may be, for example, text data (word, sentence, paragraph, story, etc.), gesture data (mouse clicks, hand motions, etc.), audio data (speech, other sounds, etc.), or combinations thereof. A set of media assets is then identified based at least upon an analysis of the identified event. At least some of the contextual information is associated in a processor-accessible memory system with the chosen event, at least one asset in the set of media assets, or both the chosen event and at least one asset in the set of media assets. The contextual information may be associated with the chosen event or some or all of the media assets, for example, via changes in metadata linked to the chosen event or assets, respectively. By using an event to identify media assets to which contextual information is associated, fewer and more relevant media assets may be retrieved and annotated as compared to conventional techniques.

In some embodiments, the set of media assets comprises a plurality of media assets, and wherein at least some of the contextual information is associated with all of the plurality of media assets in an efficient and contextual manner. In this regard, annotation of a large set of media assets may occur based upon relatively little contextual information. And the set of media assets annotated may be highly relevant to the contextual information because all of the media assets in the set have already been associated with the chosen event. In other words, because the media assets in the set are associated with a chosen event (which was identified based on the contextual information), a relatively high degree of probability exists that the media assets are relevant to the contextual information and, thus, that they are properly being annotated.

In some embodiments, the contextual information includes a first set of contextual information and a second set of contextual information, the second set being received after the first set. In some of these embodiments, the chosen event is identified at least by identifying a plurality of candidate events based at least upon an analysis of the first set of contextual information at a time when the second set of contextual information has not yet been received; and identifying the chosen event from the plurality of candidate events based at least upon an analysis of the second set of contextual information. In this regard, as contextual information is being input, such as by the typing or speaking of a blog, an email, or other vehicle for telling of a story, the chosen event may ultimately be identified by a process of elimination that occurs as new contextual information is input.

Similarly, in some embodiments, the chosen event may be identified at least by identifying a subset of a plurality of candidate events based at least upon an analysis of the second set of contextual information, wherein the chosen event is identified from the subset of the plurality of candidate events. In this regard, the list of candidate events may continually be refined as new contextual information is being input, until a chosen event is ultimately chosen, manually or automatically, from the remaining list of candidate events.

In some embodiments, the contextual information includes a first set of contextual information and a second set of contextual information, the second set being received after the first set. In some of these embodiments, the step of identifying the chosen event includes identifying a first chosen event based at least upon an analysis of the first set of contextual information; determining that the second set of contextual information indicates a new event boundary; and identifying a second chosen event based at least upon results of the determining step and an analysis of the second set of contextual information. In these embodiments, the chosen event is the second chosen event. Consequently, as a user's story, as it is being input, changes topics or events, different media assets may be retrieved to keep up with the user's train of thought.

In some embodiments, a first set of contextual information and a second set of contextual information are received, the second set being received after the first set. In some of these embodiments, the set of media assets is identified at least by identifying a superset of media assets associated with the chosen event based at least upon an analysis of the first set of contextual information at a time when the second set of contextual information has not yet been received, the superset of media assets comprising more media assets than the set of media assets. Then, the set of media assets from the superset of media assets is identified based at least upon an analysis of the second set of contextual information. Consequently, as new contextual information is received, the identified media assets may continually be refined.

In some embodiments, the set of media assets comprises only a single chosen asset that is selected manually or automatically. In some of these embodiments, where the single chosen asset is manually selected, the second set of contextual information may include user input specifically identifying the chosen asset from the superset of media assets. Also in some of these embodiments, at least some of the contextual information may be associated with the chosen event, the chosen asset, or both the chosen event and the chosen asset. In this regard, as a user, for example, selects a retrieved media asset associated with at least the chosen media asset.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Various embodiments of the present invention pertain to utilizing received contextual information to identify a chosen event relevant to the contextual information and media assets relevant to the chosen event. Then, in some embodiments, the contextual information is used to annotate the chosen event, some or all of the media assets, or both.

Typically, when people wish to recall past moments, they think in terms of events, where an event is a period of time associated with some happening. If a person accumulates media assets, such as digital images, digital videos, digital audio files, etc., that either they captured, or obtained from other sources during the event, then the person may wish to subsequently retrieve such content as a way of remembering the event and sharing it with others. Many media assets may be associated with a particular event, especially for events spanning multiple days, such as a vacation trip, or for events of special significance, such as a wedding. Embodiments of the present invention provide mechanisms for event-based annotation and retrieval of media assets based at least upon received contextual information. These mechanisms may be utilized while a user is inputting the contextual information via the telling of a story, such as by the typing or speaking of a blog or e-mail. As the user types or tells the story, relevant events and associated media assets may be presented to the user to help jog the user's memory or to allow the user to insert them directly into the story. Other embodiments will become clear upon consideration of the remainder of this description.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. Further, it should be noted that, unless otherwise explicitly noted or required by context, the word "or" is used in this disclosure in a non-exclusive sense.

Figure 1:
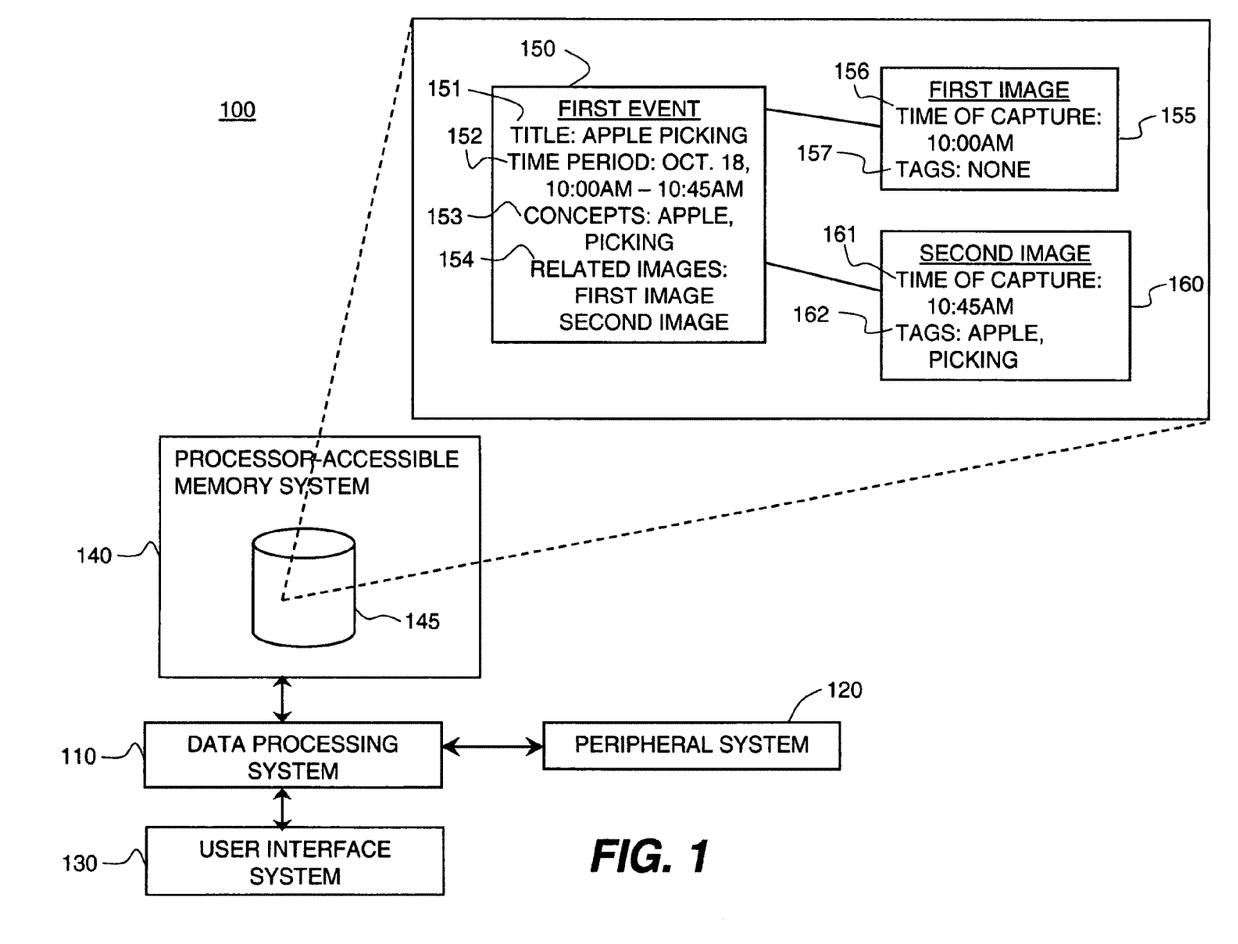
FIG. 1 illustrates a system for identifying media assets that are potentially relevant to contextual information, according to various embodiments of the present invention.

FIG. 1 illustrates a system 100 for identifying media assets that are potentially relevant to contextual information, according to various embodiments of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

The data processing system 110 includes one or more data processing devices that implement the processes of the various embodiments of the present invention, including the example processes illustrated by FIGS. 2-10 and described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, living room media center or service device, smart digital picture frame device, or any other device for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention, including the example processes illustrated by FIGS. 2-10 and described herein. The processor-accessible memory system 140 may be a distributed processor-accessible memory system including multiple processor-accessible memories communicatively connected to the data processing system 110 via a plurality of computers and/or devices. On the other hand, the processor-accessible memory system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide media assets to the data processing system 110. For example, the peripheral system 120 may include digital video cameras, cellular phones, regular digital cameras, or other data processors. The data processing system 110, upon receipt of assets from a device in the peripheral system 120, may store such assets in the processor-accessible memory system 140.

The user interface system 130 may include a mouse, a keyboard, a microphone, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the processor-accessible memory system 140 even though the user interface system 130 and the processor-accessible memory system 140 are shown separately in FIG. 1.

The data processing system 110 has access to a collection 145 of events and media assets in memory system 140. Each event in collection 145 has associated therewith a set of media assets. FIG. 1 shows as a simple example that the collection 145 includes a first event 150 that has an associated set of media assets including a first image 155 and a second image 160. The collection 145 of events and associated media assets may or may not take the form of a database. If it does take the form of a database, it may be implemented using any of the commonly practiced database technologies, including relational databases, triplestores, and object-oriented databases, flat files, or any combination thereof.

The collection 145 may include graphical representations of the media assets (155, 160, e.g.), typically including the original source, as well as potentially lower resolution, "thumbnail" images; alternatively, thumbnail images may be automatically produced as needed for display. Media assets may be entered manually into the collection 145 via user interface system 130 or peripheral system 120. For example, the media assets may be entered through the use of some import command via user interface system 130, or the data processing system may automatically import media assets as they become available, either by being present in some user-accessible portion of the processor-accessible memory system 140 (such as a watched folder), or by being present on some peripheral device in peripheral system 120, such as a camera or memory card reader.

Metadata may be associated with both assets and events in the collection 145. In the simple example of FIG. 1, the first event 150 includes metadata 151, 152, 153, 154; the first image 155 includes metadata 156, 157; and the second image 160 includes metadata 161, 162.

The metadata associated with the event 150 may indicate a title 151 of the event, a time period 152 covered by the event, concepts 153 known in the art, and what related images 154 have been linked to the event 150. In this example, the title 151 of the event 150 is "Apple Picking", the time period 152 is October 18, 10:00 to 10:45 AM, the current concepts 153 are "apple" and "picking," and the related images 154 are the first image 155 and the second image 160. The metadata 156, 157 associated with the first image 155 indicates a time of capture 156 of 10:00 AM and currently no tags 157. Similarly, the metadata 161, 162 associated with the second image 160 indicates a time of capture 161 of 10:45 AM and tags 162 "apple" and "picking". Descriptions of how concepts 153 and tags 157, 162 are updated, e.g., how event 150 and images 155, 160 are annotated are provided in more detail below. It should be noted that forms and types of metadata are well known in the art and all such forms and types are within the scope of this invention. Accordingly, one skilled in the art will appreciate that the examples of metadata shown in FIG. 1 have been simplified for purposes of clarity and are not limiting.

In addition to algorithmic means, metadata may be identified and associated with media assets and events based upon user-provided textual input. In addition, events may inherit elements of asset metadata, or include metadata derived from asset metadata. For example, the duration of an event (152, e.g.) may be deduced from the associated constituent asset metadata (155, 160, e.g.). In other words, the time period (152, e.g.) associated with an event (150, e.g.) may be derived by identifying the outer boundaries of the times of capture (156, 161, e.g.) associated with related images (155, 160, e.g.). In the example of FIG. 1, the time period 152 is derived by the starting time of capture 156 from image 155 and the ending time of capture 161 from image 160.

Further, events may have metadata determined for them by the use of autolabeling, which, for example, maps dates to the names of holidays and events using public and private calendars. For example, the data processing system 110 may automatically generate the label "Christmas" for an event including December 25$^{th}$; the data processing system 110 may generate the label "John's Graduation" for an event including the day of John's graduation, as determined by consulting a processor-accessible version of the user's personal calendar. Other algorithms may automatically generate other types of metadata, as is known in the art. Such metadata may be associated with events in collection 145 when media assets have been input and processed, without any further input or user involvement. Although there are many automatic or semi-automatic techniques for adding metadata to events, embodiments of the present invention allow—but do not require—a user to explicitly tag assets and events.

Metadata associated with assets may be obtained from a variety of means, including but not limited to, extracting metadata recorded within the asset file by the capture device or some other system component, as well as metadata derived using algorithmic techniques. Such algorithms may extract a variety of higher-level concepts, including scene classification, people recognition, place identification, and so on. Such concepts may be computed by probabilistic techniques and therefore have an associated probability.

It should be noted that, although FIG. 1 illustrates an explicit storing of relationships between an event 150 and its concepts 152, and an event 150 and its related images 154, such relationships could instead be dynamically computed.

Figure 2:
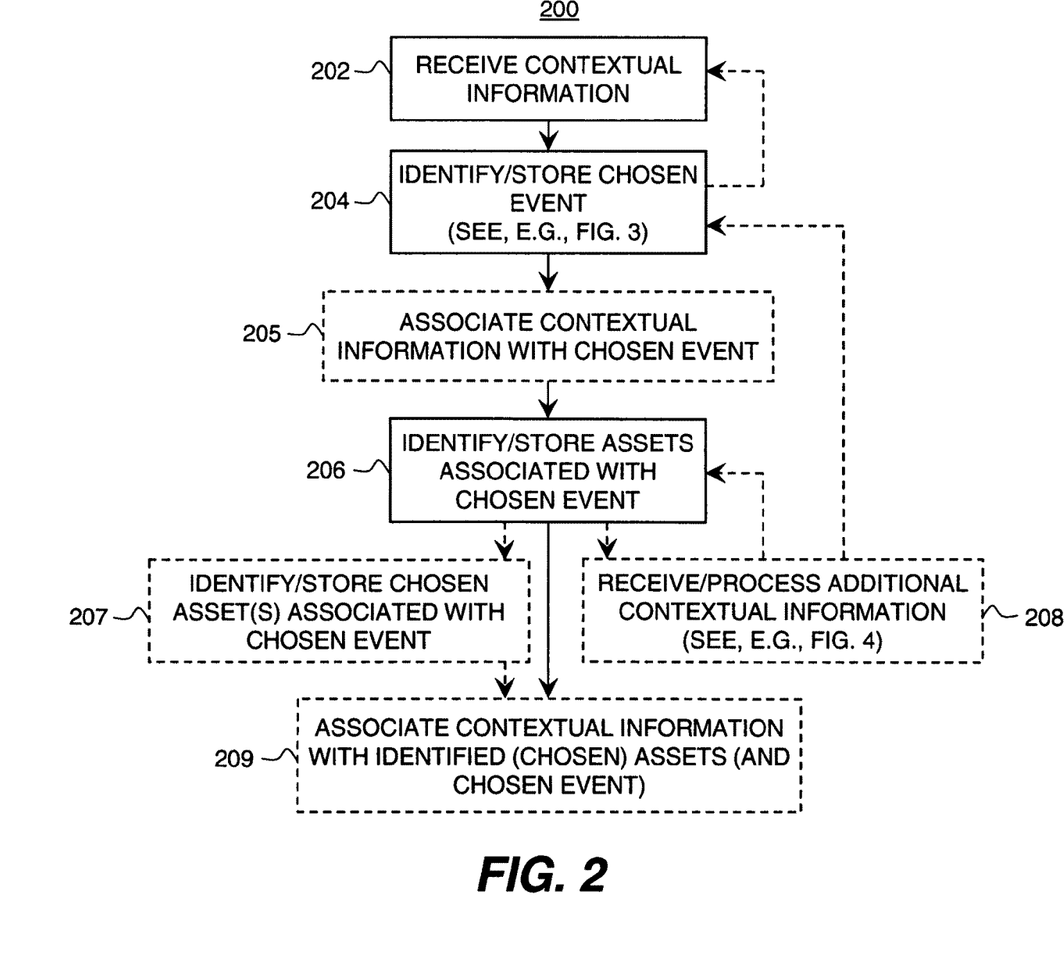
FIG. 2 illustrates methods for identifying media assets that are potentially relevant to contextual information, according to various embodiments of the present invention.

FIG. 2 illustrates a method 200 for identifying media assets that are potentially relevant to contextual information, according to various embodiments of the present invention. At step 202, contextual information is provided to and received by the data processing system 110. Contextual information may include, for example, text data (word, sentence, paragraph, story, etc.), gesture data (mouse clicks, hand motions, etc.), audio data (speech, other sounds, etc.), or combinations thereof. A mouse click could be considered gesture data that represents hand-positioning and clicking of a mouse device. In some embodiments, contextual information is provided by a user of the data processing system 110. However, such contextual information may be provided to the data processing system 110 in other ways, such as by the data processing system accessing and reading previously composed and stored text documents, audio files, etc.

In some embodiments, the contextual information is provided by and in the course of a user carrying out some task not intrinsically tied to asset retrieval. For example, in one preferred embodiment, the input could be obtained by providing the user with a means for entering text into a blog or email. Other types of input, including speech and gesture, may be allowed, although such forms must be reduced to a machine-interpretable form, using, for example, speech to text language understanding tools.

At step 204, the contextual information received at step 202 is analyzed in an attempt to identify a chosen event that is determined to be highly relevant to the contextual information. A feedback loop is shown in FIG. 2 between steps 204 and 202 to represent that steps 202 and 204 may iterate until sufficient contextual information is received by the data processing system 110 to identify the chosen event. When the chosen event is identified, an indication of it may be stored in the processor accessible memory system 140, and, in some embodiments, the user may be presented with a graphic depiction of the event.

This graphic depiction may take any number of forms, including a filmstrip view of the media assets associated with the chosen event, a single representative media asset associated with the chosen event with an ability to expand the event to see the various other media assets associated with the chosen event, and so on.

In some embodiments, at least some of the contextual information received at step 202 may be associated with the chosen event. For example, keywords, such as "apple" and "picking" may have been extracted from the contextual information at step 204, and such keywords may be inserted into the concept metadata (153 in FIG. 1, e.g.) of the chosen event (150, e.g.) at step 205. It should be noted that, in FIG. 2 (and FIG. 3), items shown in broken line are to indicate that such items are optional. Items shown in solid line in the figures, however, are not necessarily required, depending upon design choice or embodiment chosen.

At step 206, a set of media assets associated with the chosen event are identified. Once identified, an indication of such media assets may be stored in the processor-accessible memory system 140. For example, the set of media assets associated with the chosen event may be identified pursuant to the related images metadata 154 in FIG. 1. In some embodiments, the user is shown the set of media assets, and the user may then select one or more of them to incorporate into the contextual information being produced by the user. The media assets selected by the user (or, in some embodiments, by the data processing system 110) are referred to as chosen assets. Such selection is reflected by step 207 in FIG. 2. For example, if the user is composing a blog or email, the user may select the chosen media asset at step 207 and the data processing system 110 may insert the chosen media asset into the blog, email, etc. at the current cursor location.

Having identified a set of media assets at step 206, additional contextual information may continue to be received, as reflected by step 208. As described in more detail below with respect to FIG. 4, depending upon the nature of the additional contextual information, either a new chosen event may be identified at step 204 or a different set of media assets may be identified at step 206.

At step 209 at least some of the contextual information received at step 202, step 208, or both may be associated with one or more of the media assets in the set of media assets identified at step 206, the chosen media asset(s) identified at step 207, or both. For example, keywords, such as "apple" and "picking" may have been extracted from the contextual information at step 204, 206, or 208, and such keywords may be inserted into the tags metadata (157, 162 in FIG. 1, e.g.) of the media assets identified at steps 206, 207, or both at step 209. In some embodiments, such keywords also may be associated with the chosen event at step 209, such as by adding such keywords to the concepts metadata 153.

Figure 3:
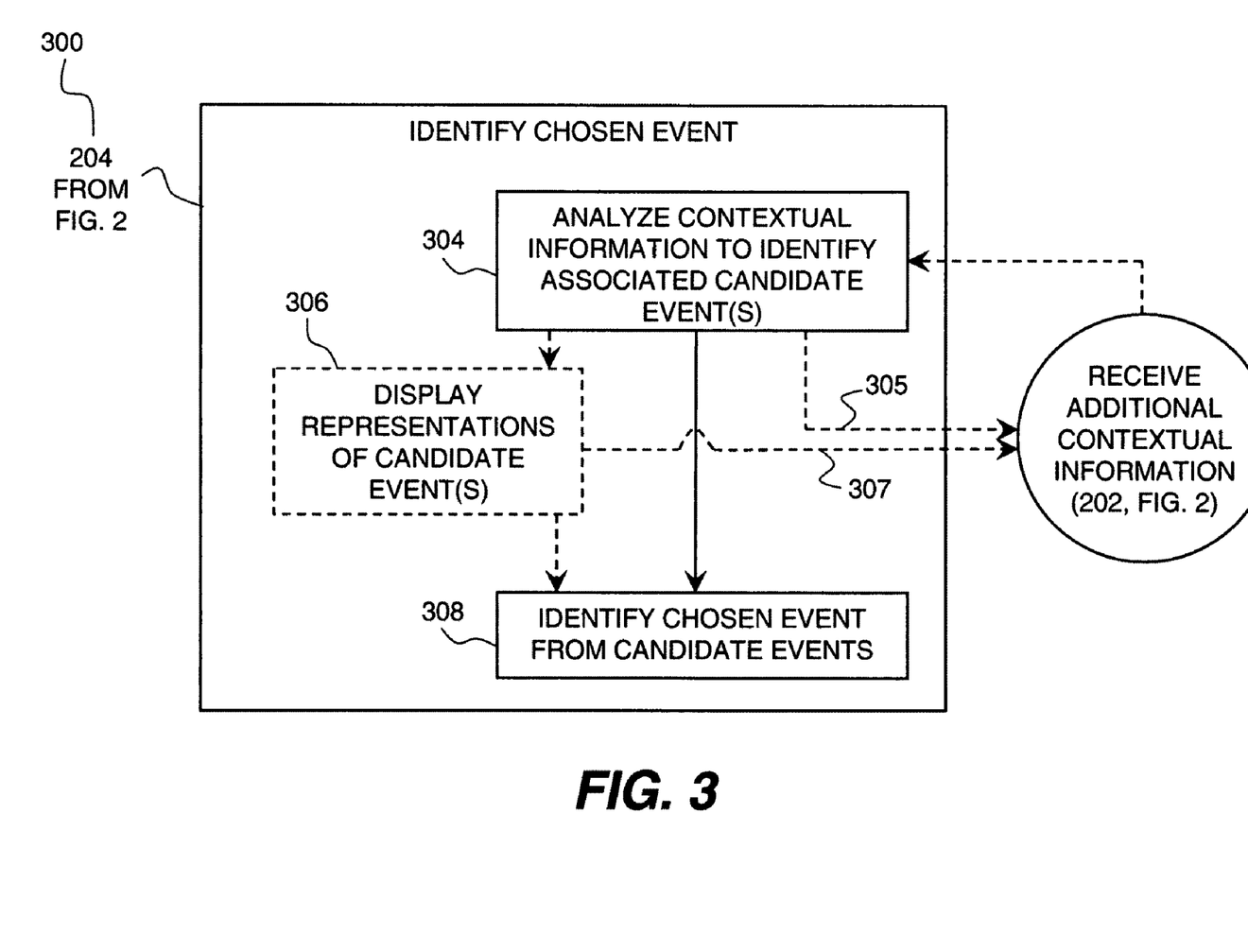
FIG. 3 illustrates identifying a chosen event based at least upon an analysis of the contextual information, according to various embodiments of the present invention.

FIG. 3 illustrates a method 300 for identifying a chosen event based at least upon an analysis of the contextual information, according to various embodiments of the present invention. The method 300 is a particular set of implementations of step 204 in FIG. 2, according to some embodiments of the present invention. It should be noted that step 204 is not limited to the particular method 300 and may take other forms in different embodiments. FIG. 3 illustrates the feedback loop between steps 202 and 204 in FIG. 2. In step 304, contextual information received at step 202 may be deemed a first set of contextual information, such as a word, a sentence, a paragraph, a story, a document, a gesture, a sequence of gestures, etc., or combinations thereof. This first set of contextual information is analyzed to identify a set of candidate events, e.g., events that have a possibility of being an event referred to by the contextual information. In the case of text as contextual information, such first set of contextual information may be analyzed at step 304 using commonly understood natural language processing techniques to extract semantic concepts. Such techniques may include simple keyword extraction and named entity extraction, or more advanced techniques that use technologies such as Wordnet to find related concepts. Such techniques may further leverage common concepts that can be typically mapped to one of the four W's—Who, What, When, Where—which can in turn provide the system with multiple dimensions (e.g., people, types of events, time, location) for mapping concepts to events and vice versa.

Figure 5:
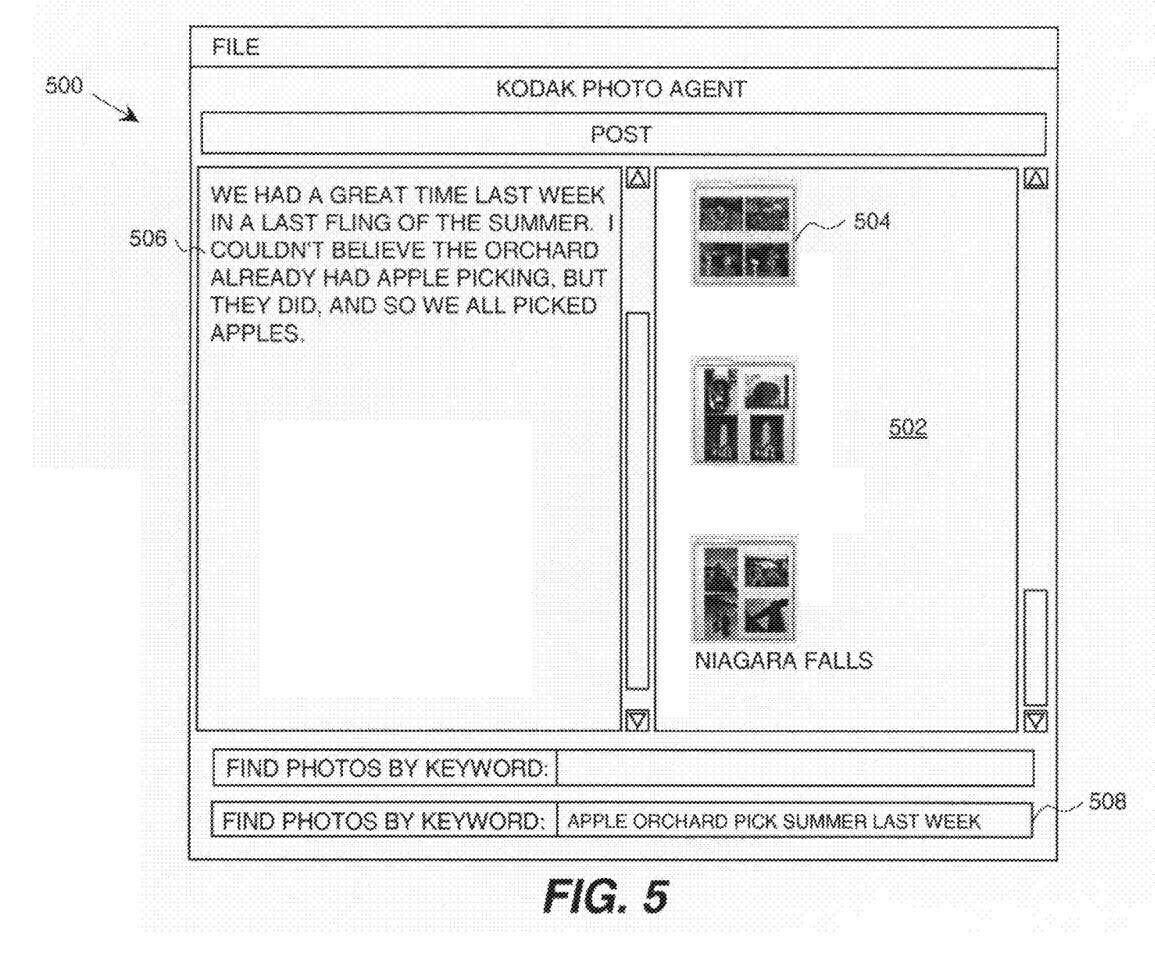
FIG. 5 illustrates identifying candidate events based at least upon an analysis of contextual information, according to an embodiment of the present invention.

The extracted concepts are then used at step 304 to identify matching candidate events using techniques known in the art, as illustrated in the scrollable thumbnail view 502 in FIG. 5 presented to the user at optional step 306. Each folder in view 502 represents a candidate event. Candidate events are identified at step 304 when there is insufficient contextual information to positively identify a particular chosen event. Accordingly, the set of candidate events identified at step 304 may further be refined or narrowed into a subset of the set of candidate events if additional contextual information, e.g., a second set of contextual information is received, as illustrated by the broken line 305. When sufficient contextual information is received at either steps 304 or 306, the chosen event is identified at step 308.

For example, at step 304, additional text may further limit the number of candidate events until only one candidate event remains. The remaining candidate event would be the chosen event. For another example, at step 306, the user may be presented with the candidate events shown in view 502 in FIG. 5. The additional contextual information received via broken arrow 307 may be the user's mouse click on one of the candidate events. In this case, the mouse click positively identifies the chosen event from the candidate events at step 308.

In other embodiments, the chosen event need not be positively identified from the candidate events. Instead, the data processing system 110 may be configured to use an optimistic approach, where it selects a chosen event if the match to a particular candidate event is sufficiently high, even though other candidate events have a possibility of being the user's preferred event. Instead of requiring the user to confirm the data processing system 110's choice of a chosen event, such embodiments may continue with the non-positively-identified chosen event as if the user had confirmed it (e.g., by a mouse click), unless the user somehow indicates to the data processing system 110 that such event was incorrectly chosen.

Steps 304 and 306, in some embodiments, may rank the candidate events (and also the assets associated with a chosen event, as described in more detail below). At step 306, higher ranking events may be shown more prominently to the user, such as at the top of the view 502 in FIG. 5. A variety of matching functions may be used to rank events and also assets, according to the strength of their similarity to the provided contextual information. A simple algorithm may be used to simply rank according to what percentage of the semantic concepts associated with an asset or an event match the provided contextual information. Some embodiments treat temporal information such as "last weekend" separately from non-temporal information. Temporal concepts are mapped to the corresponding time period, so the phrase "last Saturday" would first be mapped to the temporal range beginning at midnight of the last Friday and extending for 24 hours. Concepts such as "last weekend" may be mapped to fuzzy intervals. In performing the event or asset ranking, some embodiments only considers assets or events occurring within (or approximately within) the specified temporal boundary.

Figure 6:
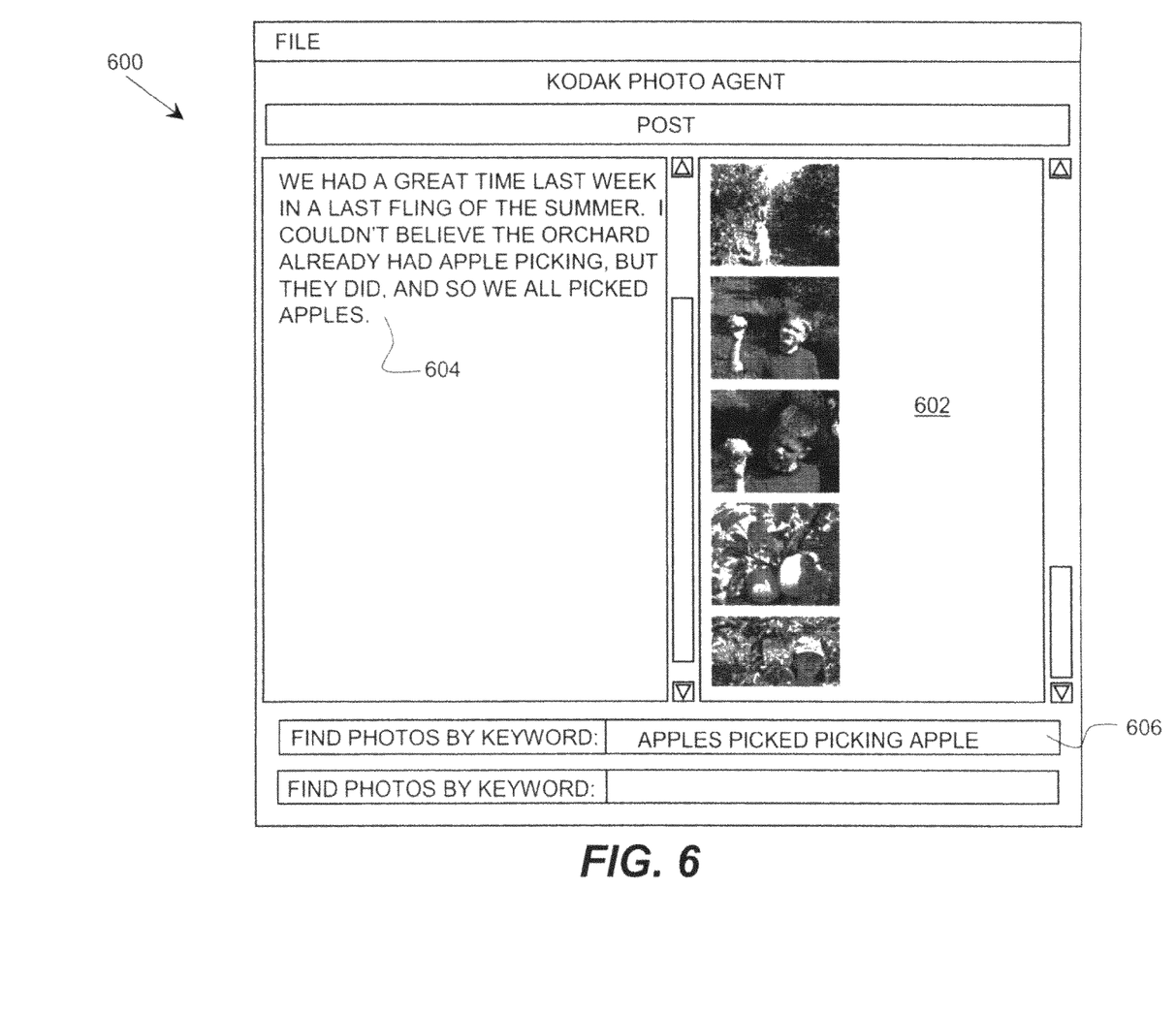
FIG. 6 illustrates a set of media assets identified based at least upon an analysis of a chosen event, according to an embodiment of the present invention.

In some embodiments, the user selects the chosen event from the set of candidate events by, for example, clicking on the graphic representation of the event. Such user selection may be considered the receipt of an additional set of contextual information at step 202 in FIGS. 2 and 3. In FIG. 5, the user may click on the graphic representation of the appropriate event, for example, the folder 504. Note that FIG. 5 illustrates the event corresponding to folder 504 before keywords "apple" and "picking" have been associated with any assets belonging to the event, and therefore before the title "apple picking" has been associated with the event. This selection (i.e., the clicking on the folder 504) results in the data processing system 110 expanding the event to show the set of media assets 602 associated with the event, as illustrated in FIG. 6. Alternative embodiments, using a more optimistic approach, may display a set of media assets associated with a chosen event identified by the data processing system 110, without requiring the user to confirm that the chosen event is the one actually preferred by the user. Implementations may, of course, provide the user with a way to navigate to other media assets associated with other events if the user so chooses.

Once the chosen event has been identified at step 308, the data processing system 110 is now positioned to associate additional contextual information with the event (step 205 or step 209), and with some or all of the media assets associated with the chosen event (step 209). Without the user providing any additional sets of contextual information, the context used to match the event may be mined for additional semantic concepts not already associated with the event; these additional concepts may now be associated with the event. For example, in FIG. 5, the three displayed events may have originally matched the contextual information simply based on the phrase "last week"—these events all took place last week. The simple keyword extractor illustrated in FIG. 6 extracts the concepts 606 when the insertion point is at point 604. These concepts may automatically be associated at this point with the event, such as by inserting them into metadata 153 shown in FIG. 1 and FIG. 10, which shows "APPLE" and "PICKING" associated with the folder 1004, as compared to folder 504 in FIG. 5. A purpose of automatic annotation of media assets and related chosen events is to facilitate improved retrieval in the future.

In some embodiments, the user may drag and drop assets into the text. For example, in FIG. 7, the user has selected a media asset 706 from the set of media assets in scrollable display 702. This selection may be considered the receipt of an additional set of contextual information at step 207 that causes the data processing system to identify the media asset 706 as a chosen media asset. Note that the same extracted concepts used to match the event may also be used to rank the assets within the event. In this example of FIG. 7, the chosen media asset 706 is inserted at the insertion point 704 causing the media asset to be displayed at point 708 within the text.

In some other embodiments, the system may optimistically identify the chosen media asset without requiring user confirmation. For example, if only one media asset matches the contextual information, or the strength of the match for one media asset is much higher than the strength of the match for the other media assets, then the system may automatically select that media asset as having been chosen. While this sort of optimistic selection may be inappropriate for some applications, it may be very desirable for real-time interaction where user input should be kept to a minimum, either by user choice, or user limitations such as a disability.

Figure 7:
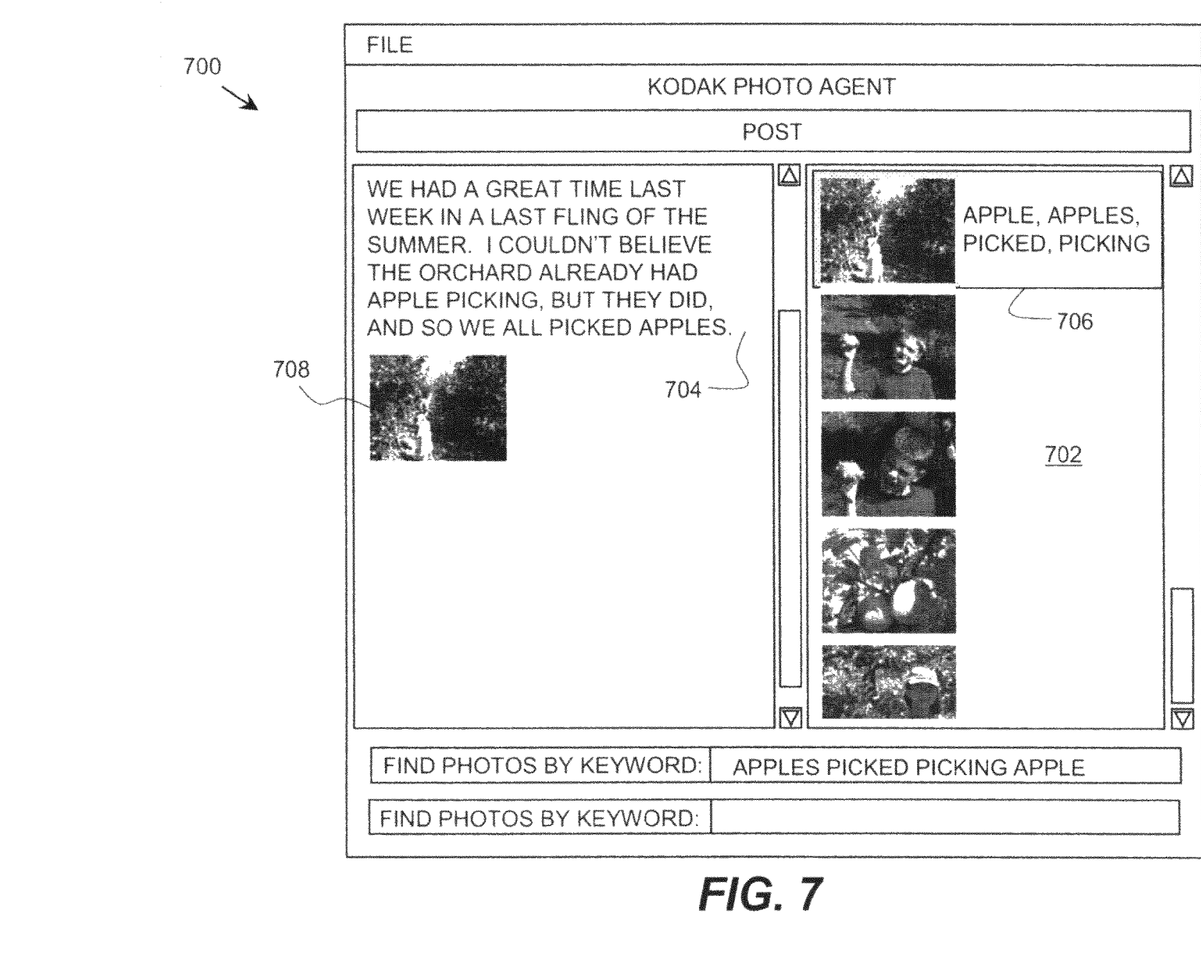
FIG. 7 and FIG. 8 illustrate the associating of at least some received contextual information with at least some of an identified set of media assets, according to embodiments of the present invention.

At step 209, the data processing system 110 may be configured to associate the concepts "apple," "apples," "picked," and "picking" derived from the contextual information with the chosen media asset 706 when it is selected by the user. (It should be noted that although FIG. 7 illustrates the use of a simple keyword extractor to extract the keywords, or concepts, "apple," "apples," "picking" and "picked", some embodiments use more sophisticated natural language processing techniques. Such more sophisticated natural language processing techniques may reduce words to their base forms and generate concise labels, such as "apple picking.")

The association of derived concepts with media assets may occur by inserting such concepts into the tag metadata (157 in FIG. 1, e.g.) associated with the chosen media asset. Other embodiments may associate some or all of these concepts with both a plurality or even all of the media assets in view 702 associated with the chosen event, where, for example, there is sufficient similarity between the media assets. Still other embodiments may also associate some or all of these concepts with the chosen event related to the media assets in view 702 at step 209.

In this regard, in addition to directly inheriting concepts from media assets (155, 160, e.g.) associated with a chosen event, alternative embodiments may use more sophisticated summarization techniques to associate concepts with chosen events. To ensure that concepts adequately apply to the chosen event as a whole, and not just specific media assets, the data processing system 110 may choose to only associate concepts with a chosen event where such concepts are associated with a sufficiently high percentage of the media assets in the set associated with the chosen event. The data processing system 110 may also associate a confidence score with each concept, measuring the strength of the data processing system 110's belief of the applicability of the concept to the event. Such a score may be factored into an event ranking algorithm, for example, when identifying candidate events at step 304 in FIG. 3.

Figure 4:
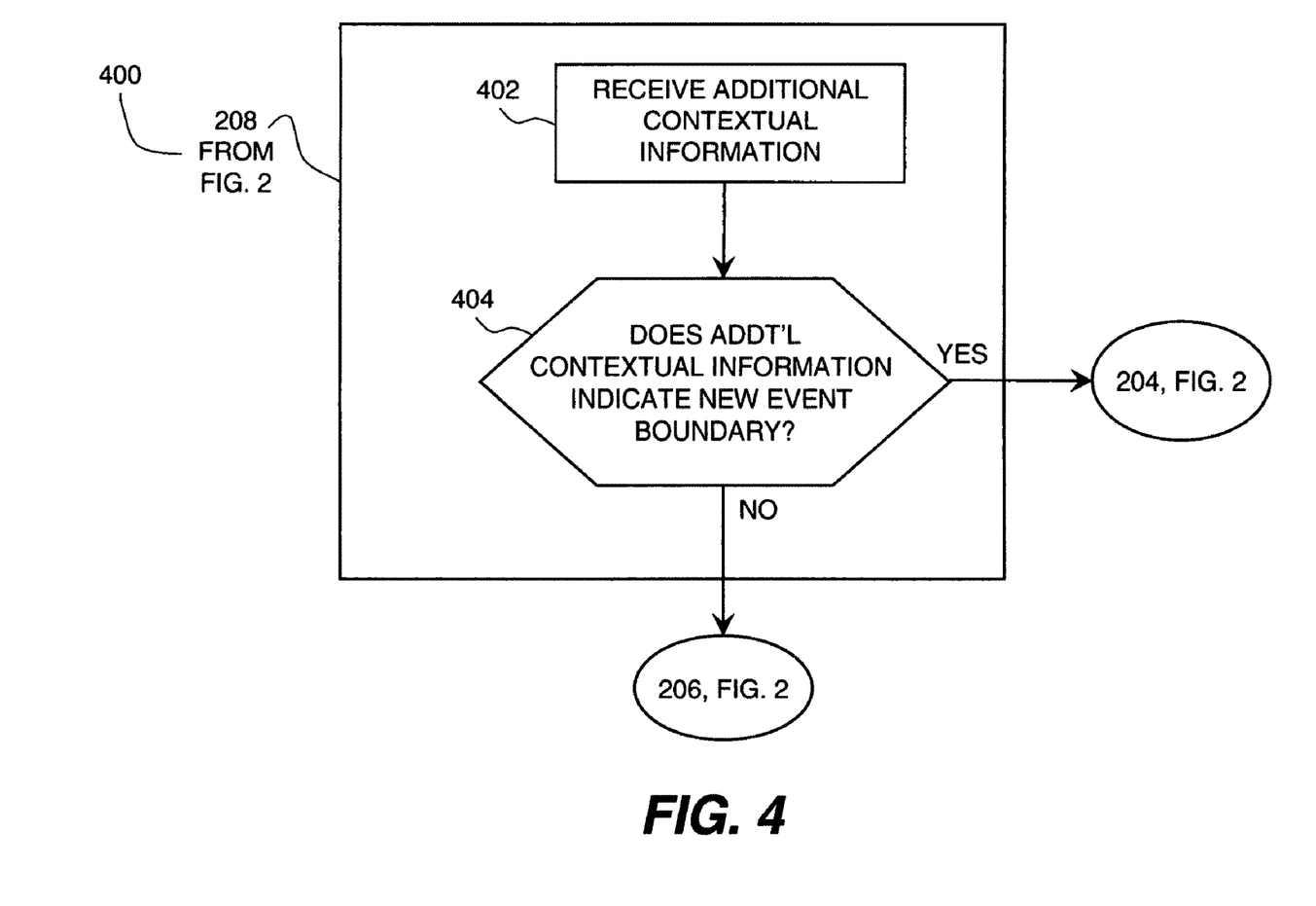
FIG. 4 illustrates identifying whether or not additional contextual information represents a new event boundary, according to various embodiments of the present invention.

FIG. 4 illustrates a method 400 for identifying whether or not additional sets of contextual information represent a new event boundary, according to various embodiments of the present invention. The method 400 is a particular implementation of step 208 in FIG. 2, according to some embodiments of the present invention. It should be noted that step 208 is not limited to the particular method 400 and may take other forms in different embodiments. At step 402, an additional set of contextual information is received by the data processing system 110, such as by a user inputting additional text in a story being written. At step 404, the data processing system 110 determines whether or not this additional set of contextual information indicates a new event boundary. A new event boundary in some embodiments may be considered, for example, a change in topics in a story being written by a user.

If the additional set of contextual information does not indicate a new event boundary at step 404, processing proceeds to step 206 in FIG. 2, where the identified set of media assets associated with a chosen event may be refined or narrowed based upon the additional set of contextual information. In other words, if the data processing system 110 determines that a new event boundary has not been crossed, the data processing system 110 determines that the current chosen event is still correct. If the chosen event is still correct, a new chosen event need not be identified, and the newly received set of contextual information may instead be used to refine or narrow the set of media assets associated with the current chosen event. Stated differently, assume that step 206 identifies a superset of media assets associated with the chosen event based at least upon an analysis of a first set of contextual information. Then assume that a second set of contextual information is received at step 402, which results in a finding of no new event boundary at step 404. This second set of contextual information may then be used at step 206 to eliminate media assets in the superset of media assets, thereby generating a set of media assets smaller than the superset upon completion of the second execution of step 206.

Figure 8:
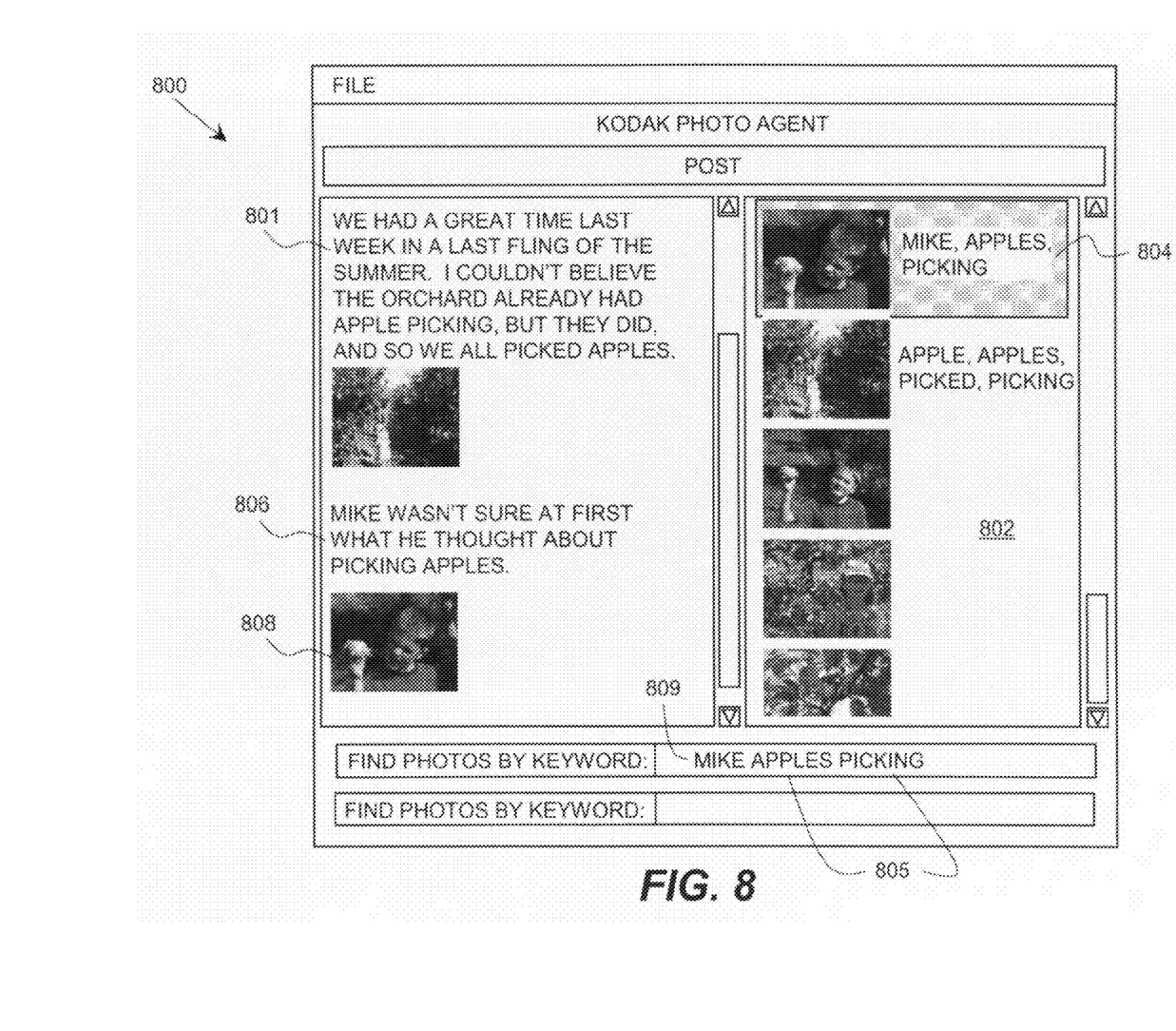

FIG. 8 provides an example of this situation, where the user has provided an additional set of contextual information, in this case, text 806. The data processing system 110 may be configured to determine that a new event boundary has not been detected by the text 806, because it recognizes the concepts 805 "apples" and "picking" in the additional text 806, which are similar to the concepts found in the original set of contextual information 801. Since no new event boundary is detected at step 404 in this case, processing moves to step 206, where the concept "Mike" 809 in the additional text 806 may be used to refine the set of media assets shown in view 802. In this example, the concept "Mike" 809 is used to re-rank or re-order the media assets in view 802 so that a media asset 804 showing Mike is moved to the top of the view 802. In alternative embodiments, the concept "Mike" 809 may be used to reduce the number of assets in the set of media assets in view 802.

Also shown in FIG. 8 is the data processing system 110's receipt of user confirmation of the displayed asset 804's relevance. This confirmation may be considered still a further additional set of contextual information received by system 110. In some embodiments, this user confirmation is carried out by the user dragging and dropping the media asset 804 from the filmstrip view 802, resulting in the media asset being identified as a chosen media asset at step 207 and displayed at point 808. The concepts of "apple" and "picking" are extracted by the simple keyword extractor illustrated in the figure, and attached to the media asset 804, in accordance with step 209 in FIG. 2. Additional concepts may also be associated with the currently chosen event, if not already present.

Figure 9:
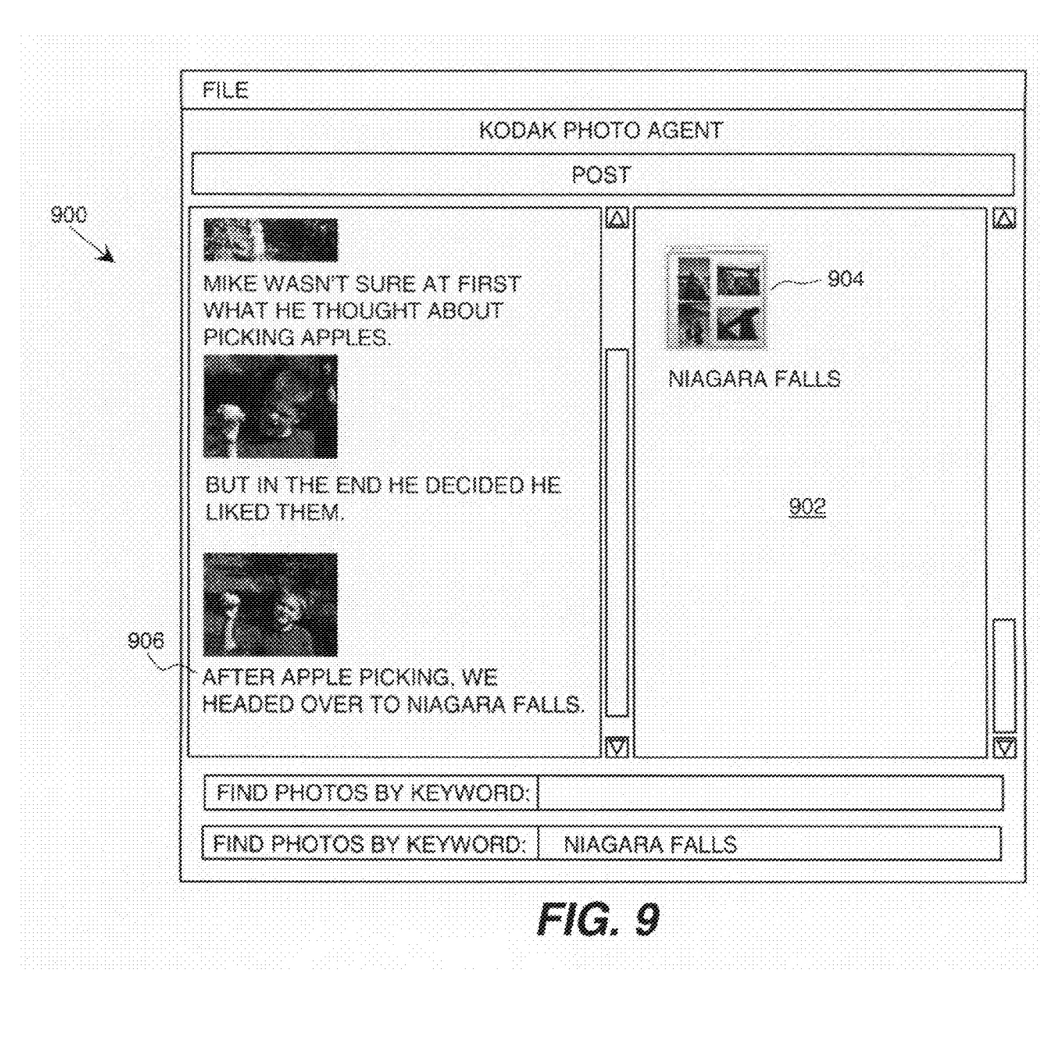
FIG. 9 illustrates a new event boundary detected by receipt of additional contextual information, according to an embodiment of the present invention.
Figure 10:
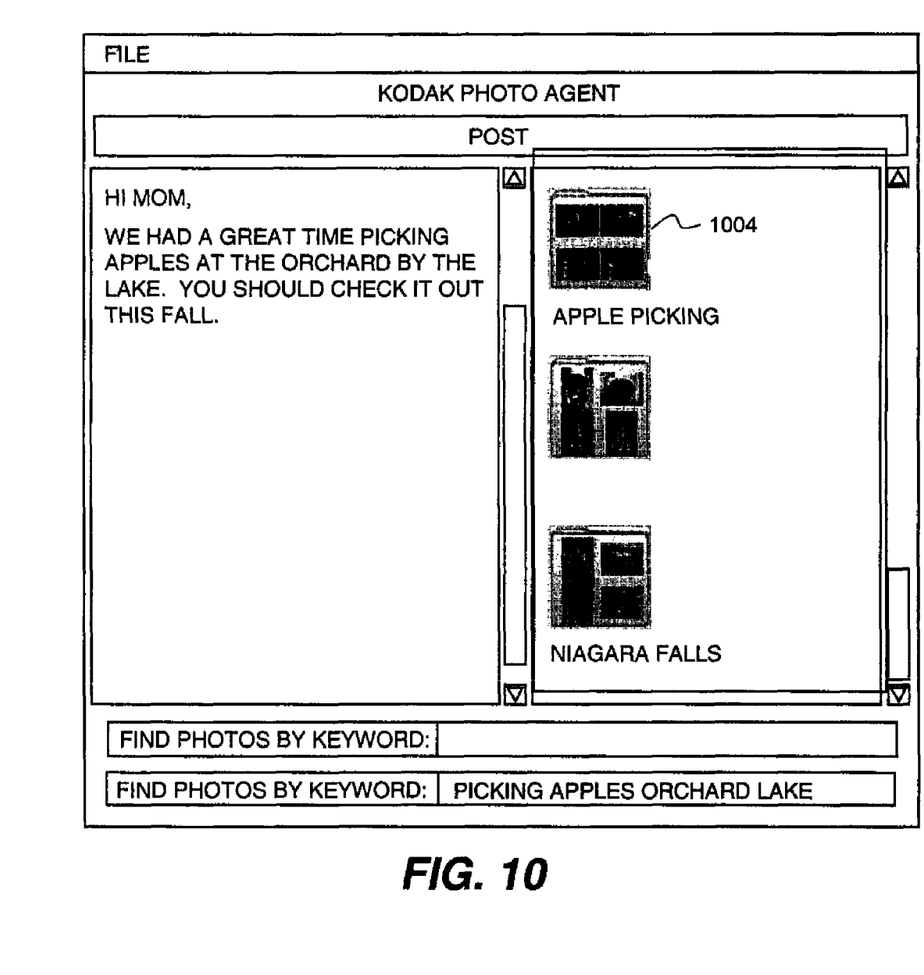
FIG. 10 illustrates how prior annotations improve later identification of candidate events, according to an embodiment of the present invention.

If the additional set of contextual information received at step 402 of FIG. 4 indicates a new event boundary, as tested at step 404, then the data processing system 110 identifies the new chosen event using at least the newly provided set of contextual information at step 204 in FIG. 2. See FIG. 9, for example, which illustrates a new event boundary detected by receipt of an additional set of contextual information, according to an embodiment of the present invention. In FIG. 9, the user has provided an additional set of contextual information 906, which has resulted in the identification of a new chosen event 904 being displayed in the thumbnail view 902.

The determination of new event boundaries at step 404 in FIG. 4 may be accomplished using any of a variety of discourse analysis techniques from the field of linguistics. For example, a rudimentary technique is to trigger off of new paragraphs, where paragraph breaks are indicated by text beginning on a new line. More sophisticated techniques may also be used to determine the likelihood of a sentence or paragraph indicating a change of event in the narrative, including the use of more sophisticated segmentation markers such as temporal expressions. U.S. Pat. No. 6,810,146 to Loui and Stent is understood to describe an algorithm for detecting event changes in a sequence of image captions, which has applicability here, where the algorithm is adapted to apply to a series of sentences and paragraphs rather than image captions. Their algorithm is understood to incorporate a number of linguistic techniques in computing a score for determining narrative event changes; if the score is above some threshold, then the narrative is deemed to be describing a new event.

The present description has commonly referred to sets of contextual information. One or more of those sets may be received by the data processing system 110, for example, at steps 202, 206 (by user selection of a chosen event, e.g.), 207 (by user selection of a chosen media asset, e.g.), 208. In this regard, it may be said that the data processing system collectively receives contextual information over a period of time throughout the processes of FIG. 2, this collective contextual information including all of the individual sets of contextual information received, for example, at steps 202, 206, 207, 208.

Further, the present description commonly refers to events that are well known in this art. It is also well known in the art that events may be hierarchical in nature. For example, a super-event may be divided into sub-events, and the sub-events may be divided into sub-sub-events, etc. In this regard, the term "event," as used herein, is intended to include any dividable or non-dividable event. For instance, a chosen event identified at step 204 may be a super-event that is dividable in some embodiments into one or more sub-events. On the other hand, a chosen event identified at step 204 may be an event that cannot be divided into any sub-events. The same applies for the candidate events identified at step 304, which may be super-events, non-dividable events, or both, depending upon design choice. In the situation where hierarchical events are used, the hierarchy can be leveraged for both annotation and selection. Consider the case of a summer vacation to Europe, where the top-level super-event represents the whole vacation, and the next level of sub-events is initially determined by date, with the media assets for each day forming a separate sub-event. The user could provide as contextual input, "Our summer vacation was a trip of a lifetime. We spent the first three days in Italy, four days in France and ended our trip in England." The system could use this context to automatically group the sub-events by day into new higher-level sub-events, annotate the new sub-events by country, and label the top-level super-event with Europe. Then, when the user subsequently provides as contextual input, "In France, . . . ", the system could appropriately select and display the sub-event corresponding to media captured in France.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST 100 system
110 data processing system
120 peripheral system
130 user interface system
140 processor-accessible memory system
145 collection
150 first event
151 metadata
152 time period
153 concepts
154 related images
155 first image
156 capture
157 tags
160 second image
161 capture
162 tags
200 method
202 step
204 step
205 step
206 step
207 step
208 step
209 step
300 method
304 step
305 broken line
306 optional step
307 broken arrow
308 step
400 method
402 step
404 step
502 scrollable thumbnail view
504 folder
602 set of media assets
604 point
606 concepts
702 scrollable display
704 insertion point
706 chosen media asset
708 point
801 original set of contextual information
802 filmstrip view
804 displayed asset
805 concepts
806 additional text
808 point
902 thumbnail view
904 new chosen event
906 additional set of contextual information

What is claimed is:

1. A method implemented at least in part by a data processing system, the method for identifying media assets that are potentially relevant to contextual information, and the method comprising the steps of:
   receiving, by the data processing system, the contextual information, wherein the received contextual information comprises a first set of contextual information and a second set of information, the second set being received after the first set;
   identifying a chosen event based at least upon an analysis of the contextual information;
   identifying a set of media assets based at least upon an analysis of the identified event, wherein the step of identifying the set of media assets comprises:
      identifying a superset of media assets associated with the chosen event based at least upon an analysis of the first set of contextual information at a time when the second set of contextual information has not yet been received, the superset of media assets comprising more media assets than the set of media assets; and
      identifying the set of media assets from the superset of media assets based at least upon an analysis of the second set of contextual information;
   associating, in a processor-accessible memory system, at least some of the contextual information with the chosen event, or at least one asset in the set of media assets, or both the chosen event and at least one asset in the set of media assets.

2. The method of claim 1, wherein the set of media assets comprises only a single chosen asset, and wherein the second set of contextual information comprises user input specifically identifying the chosen asset from the superset of media assets.

3. The method of claim 2, wherein the step of associating associates at least some of the contextual information with at least the chosen media asset.

4. A processor-accessible memory system storing instructions configured to cause a data processing system to implement a method for identifying media assets that are potentially relevant to contextual information, wherein the instructions comprise:
- instructions for receiving the contextual information, wherein the received contextual information comprises a first set of contextual information and a second set of contextual information, the second set being received after the first set;
- instructions for identifying a chosen event based at least upon an analysis of the contextual information;
- instructions for identifying a set of media assets based at least upon an analysis of the identified event, wherein the step of identifying the set of media assets comprises:
  - identifying a superset of media assets associated with the chosen event based at least upon an analysis of the first set of contextual information at a time when the second set of contextual information has not yet been received, the superset of media assets comprising more media assets than the set of media assets; and
  - identifying the set of media assets from the superset of media assets based at least upon an analysis of the second set of contextual information;
- instructions for associating, in a processor-accessible memory system, at least some of the contextual information with the chosen event, or at least one asset in the set of media assets, or both the chosen event and at least one asset in the set of media assets.

5. A system comprising:
a data processing system; and
a memory system communicatively connected to the data processing system and storing instructions configured to cause the data processing system to implement a method for identifying media assets that are potentially relevant to contextual information, wherein the instructions comprise:
- instructions for receiving the contextual information, wherein the received contextual information comprises a first set of contextual information and a second set of contextual information, the second set being received after the first set;
- instructions for identifying a chosen event based at least upon an analysis of the contextual information;
- instructions for identifying a set of media assets based at least upon an analysis of the identified event, wherein the step of identifying the set of media assets comprises:
  - identifying a superset of media assets associated with the chosen event based at least upon an analysis of the first set of contextual information at a time when the second set of contextual information has not yet been received, the superset of media assets comprising more media assets than the set of media assets; and
- identifying the set of media assets from the superset of media assets based at least upon an analysis of the second set of contextual information;
- instructions for associating, in the processor-accessible memory system, at least some of the contextual information with the chosen event, or at least one asset in the set of media assets, or both the chosen event and at least one asset in the set of media assets.

* * * * *

UNITED STATES PATENT AND TRADEMARK OFFICE
CERTIFICATE OF CORRECTION

PATENT NO. : 8,024,311 B2  Page 1 of 1
APPLICATION NO. : 12/328793
DATED : September 20, 2011
INVENTOR(S) : Mark D. Wood et al.

It is certified that error appears in the above-identified patent and that said Letters Patent is hereby corrected as shown below:

| Column | Line | |
|---|---|---|
| 14 | 37 | In Claim 1, before "information," insert -- contextual --. |
| 14 | 47 | In Claim 1, delete "vet" and insert -- yet --, therefor. |

Signed and Sealed this
Third Day of January, 2012

David J. Kappos
*Director of the United States Patent and Trademark Office*